(12) United States Patent
Singh

(10) Patent No.: US 11,822,650 B2
(45) Date of Patent: Nov. 21, 2023

(54) SYSTEM AND METHOD FOR PREVENTION OF TRANSFER OF SENSITIVE INFORMATION

(71) Applicant: Citrix Systems, Inc., Fort Lauderdale, FL (US)

(72) Inventor: Manbinder Pal Singh, Coral Springs, FL (US)

( * ) Notice: Subject to any disclaimer, the term of this patent is extended or adjusted under 35 U.S.C. 154(b) by 223 days.

(21) Appl. No.: 17/123,262

(22) Filed: Dec. 16, 2020

(65) Prior Publication Data

US 2022/0188413 A1    Jun. 16, 2022

(51) Int. Cl.
*G06F 21/55*    (2013.01)
*G06F 21/52*    (2013.01)
*G06F 21/62*    (2013.01)
G06F 40/253    (2020.01)

(52) U.S. Cl.
CPC ............ *G06F 21/554* (2013.01); *G06F 21/52* (2013.01); *G06F 21/629* (2013.01); *G06F 21/6245* (2013.01); *G06F 40/253* (2020.01); *G06F 2221/034* (2013.01); *G06F 2221/2115* (2013.01)

(58) Field of Classification Search
CPC .................. G06F 21/554; G06F 2221/034
See application file for complete search history.

(56) References Cited

U.S. PATENT DOCUMENTS

| | | | | |
|---|---|---|---|---|
| 8,181,036 | B1* | 5/2012 | Nachenberg | H04L 63/1416 |
| | | | | 709/224 |
| 9,183,384 | B1* | 11/2015 | Bruhmuller | G06F 21/552 |
| 10,079,835 | B1* | 9/2018 | Dodke | G06F 21/6245 |
| 2007/0101427 | A1* | 5/2007 | Toomey | G06F 21/6245 |
| | | | | 726/25 |
| 2009/0100184 | A1* | 4/2009 | Chakra | G06F 21/554 |
| | | | | 709/229 |
| 2015/0324609 | A1* | 11/2015 | Grubel | G06F 21/64 |
| | | | | 726/26 |
| 2016/0078238 | A1* | 3/2016 | Paul | G06F 21/64 |
| | | | | 726/26 |
| 2017/0185799 | A1* | 6/2017 | Zheng | G06F 16/9535 |
| 2017/0193246 | A1* | 7/2017 | Kelly | G06F 21/83 |
| 2018/0276393 | A1* | 9/2018 | Allen | G06F 21/602 |
| 2018/0288051 | A1* | 10/2018 | Hockings | G06F 21/556 |
| 2019/0340376 | A1 | 11/2019 | Fleck | |
| 2019/0364395 | A1* | 11/2019 | Trojanowski | G06F 40/30 |
| 2021/0125089 | A1* | 4/2021 | Nickl | G06F 21/554 |
| 2021/0200886 | A1* | 7/2021 | Ramamurthy | G06F 21/629 |

OTHER PUBLICATIONS

Extended European Search Report issued in App. No. EP21208450.3, dated Apr. 29, 2022, 10 pages.

* cited by examiner

*Primary Examiner* — David J Pearson

(57) ABSTRACT

In one aspect, an example methodology implementing the disclosed techniques includes, by a computing device, monitoring an application for suspicious activity based on keystrokes to input data to the application and detecting an instance of suspicious activity within the application based on a sequence of keystrokes to input the data to the application, the sequence of keystrokes to provide characters indicative of sensitive data and in a format different than an expected format for the input data. The method also includes, by the computing device, generating an action to prevent loss of sensitive data in response to detection of the instance of suspicious activity.

11 Claims, 11 Drawing Sheets

SYSTEM AND METHOD FOR PREVENTION OF TRANSFER OF SENSITIVE INFORMATION

BACKGROUND

Organizations such as companies, enterprises, governments, agencies, firms, associations, etc. may generate, store, and access confidential or other types of sensitive content in networked computing environments. For example, an organization may store confidential documents in cloud/network storage or access confidential information using one or more Software-as-a-Service (SaaS) or remote desktop applications. An organization may grant its employees, contractors, agents, partners or other persons associated with organization permission to access various types of content over the network, including word processing documents, spreadsheets, image files, text files, and Portable Document Format (PDF) files.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

It is appreciated herein that, although some organizations may provide security controls for protecting sensitive content, such controls may not be effective at protecting such content from various forms of insider threats. For example, a given endpoint security control solution deployed by an organization may analyze content being copied into a clipboard to deny paste operations of the sensitive content in the clipboard. However, such endpoint solutions do not prevent copy operations of data that are already in the clipboard, which allows an insider threat to use a clipboard listener tool in the chain to receive a notification when new content is placed into the clipboard, encode or otherwise convert the content, and copy the converted content from the clipboard without detection by the deployed endpoint security control. As another example, an organization may deploy a security control solution that scans data at the organization's EGRESS points to detect sensitive content. However, such EGRESS checks fail to detect content that is in a format that is not recognizable to be sensitive content. Embodiments of the present disclosure provide solutions to these and other technical problems described herein.

In accordance with one example embodiment provided to illustrate the broader concepts, systems, and techniques described herein, a method may include, by a computing device, monitoring an application for suspicious activity based on keystrokes to input data to the application and detecting an instance of suspicious activity within the application based on a sequence of keystrokes to input the data to the application, the sequence of keystrokes to provide characters indicative of sensitive data and in a format different than an expected format for the input data. The method may also include, by the computing device, generating an action to prevent loss of sensitive data in response to detection of the instance of suspicious activity.

According to another illustrative embodiment provided to illustrate the broader concepts described herein, a system includes a memory and one or more processors in communication with the memory. The processor may be configured to monitor an application for suspicious activity based on keystrokes to input data to the application, and detect an instance of suspicious activity within the application based on a sequence of keystrokes to input the data to the application, the sequence of keystrokes to provide characters indicative of sensitive data and in a format different than an expected format for the input data. The processor may be further configured to generate an action to prevent loss of sensitive data in response to detection of the instance of suspicious activity.

According to another illustrative embodiment provided to illustrate the broader concepts described herein, a method may include, by a computing device, identifying an element of a first application to protect from data loss, generating an event listener for the identified element of the first application, and detecting an instance of suspicious activity within the first application based on user operations with the first application and associated with the identified element of the first application. The method may also include, by the computing device, generating an action to prevent loss of sensitive data in response to detection of the instance of suspicious activity.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
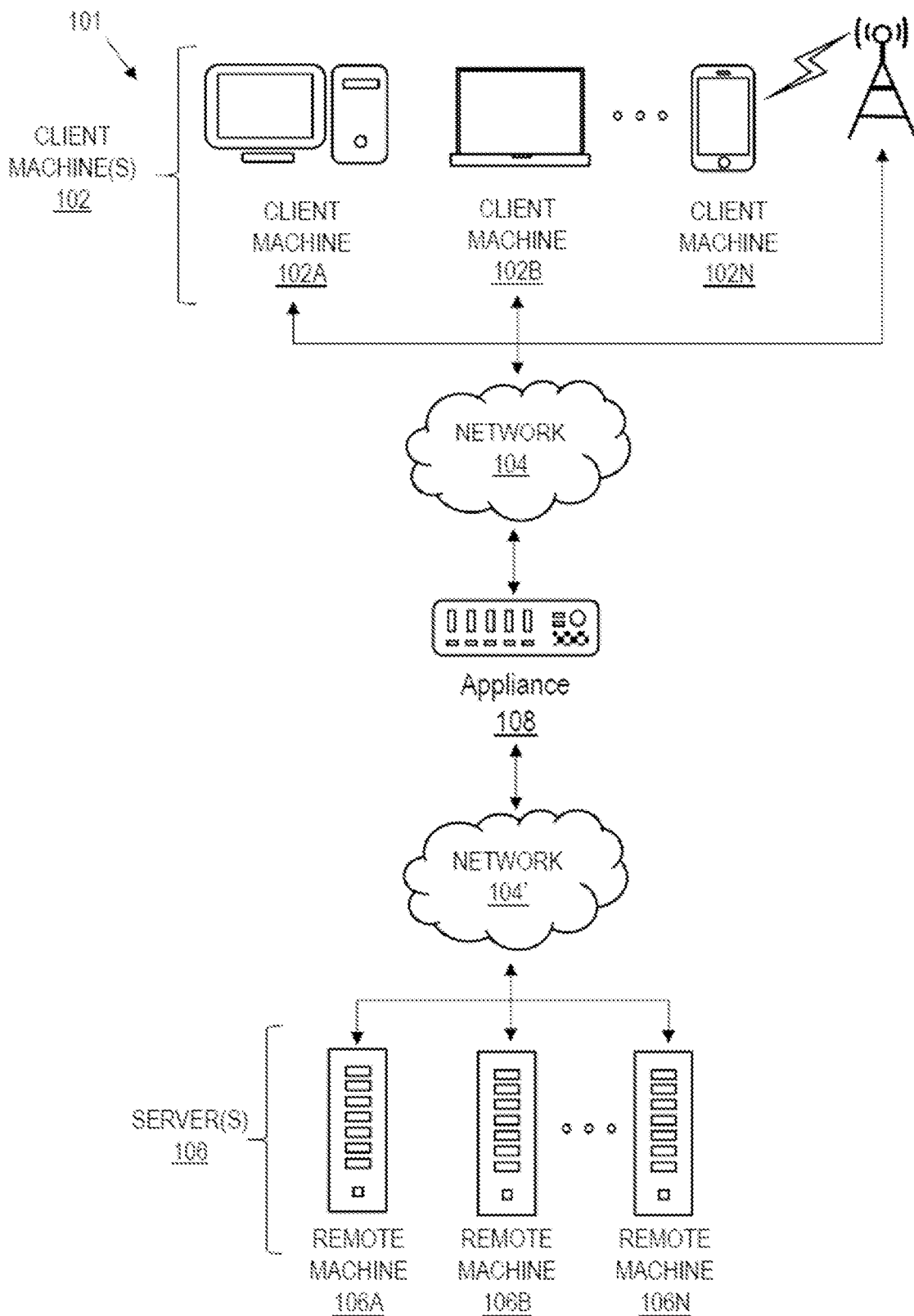
FIG. 1 is a diagram of an illustrative network computing environment in which embodiments of the present disclosure may be implemented.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
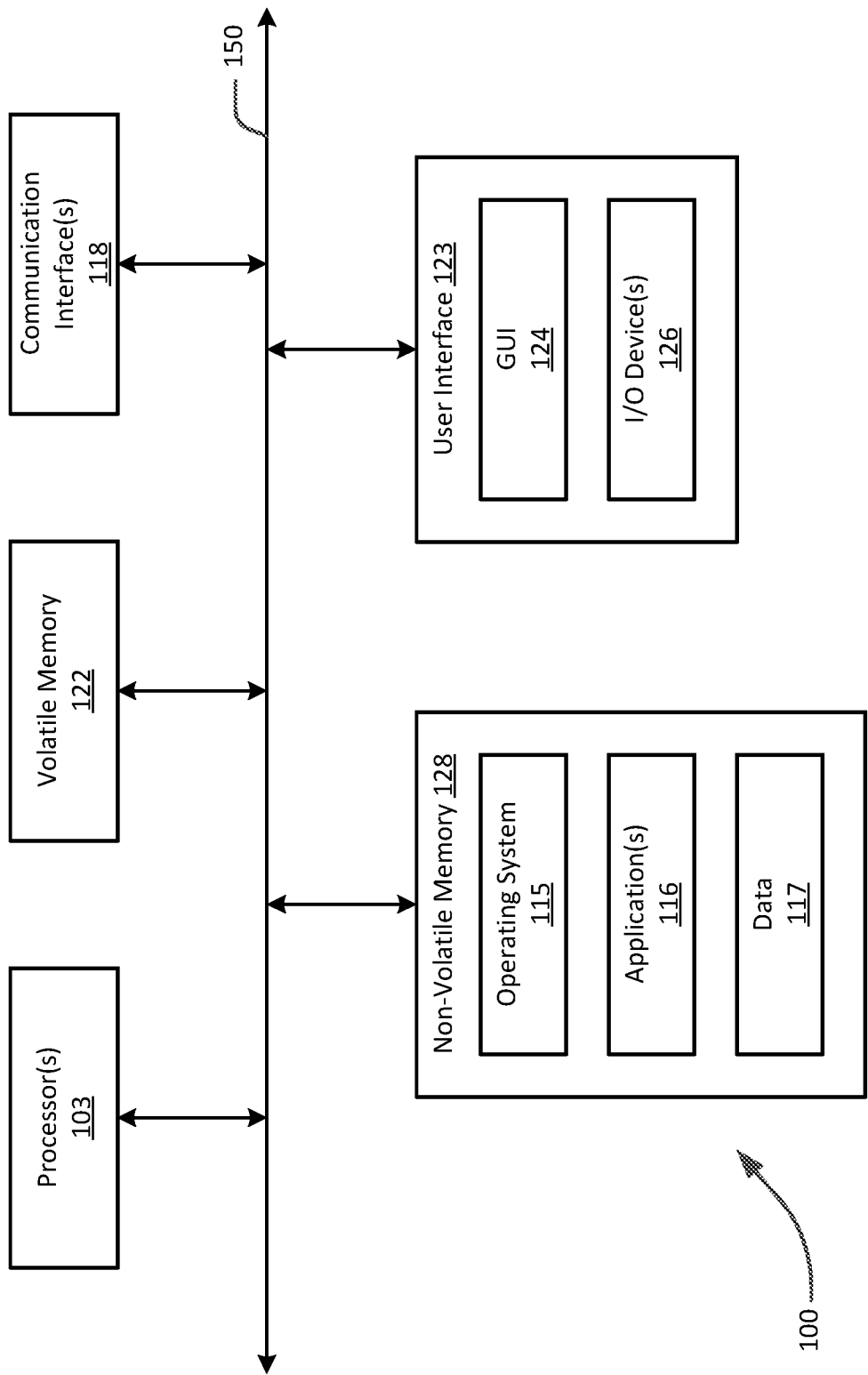
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
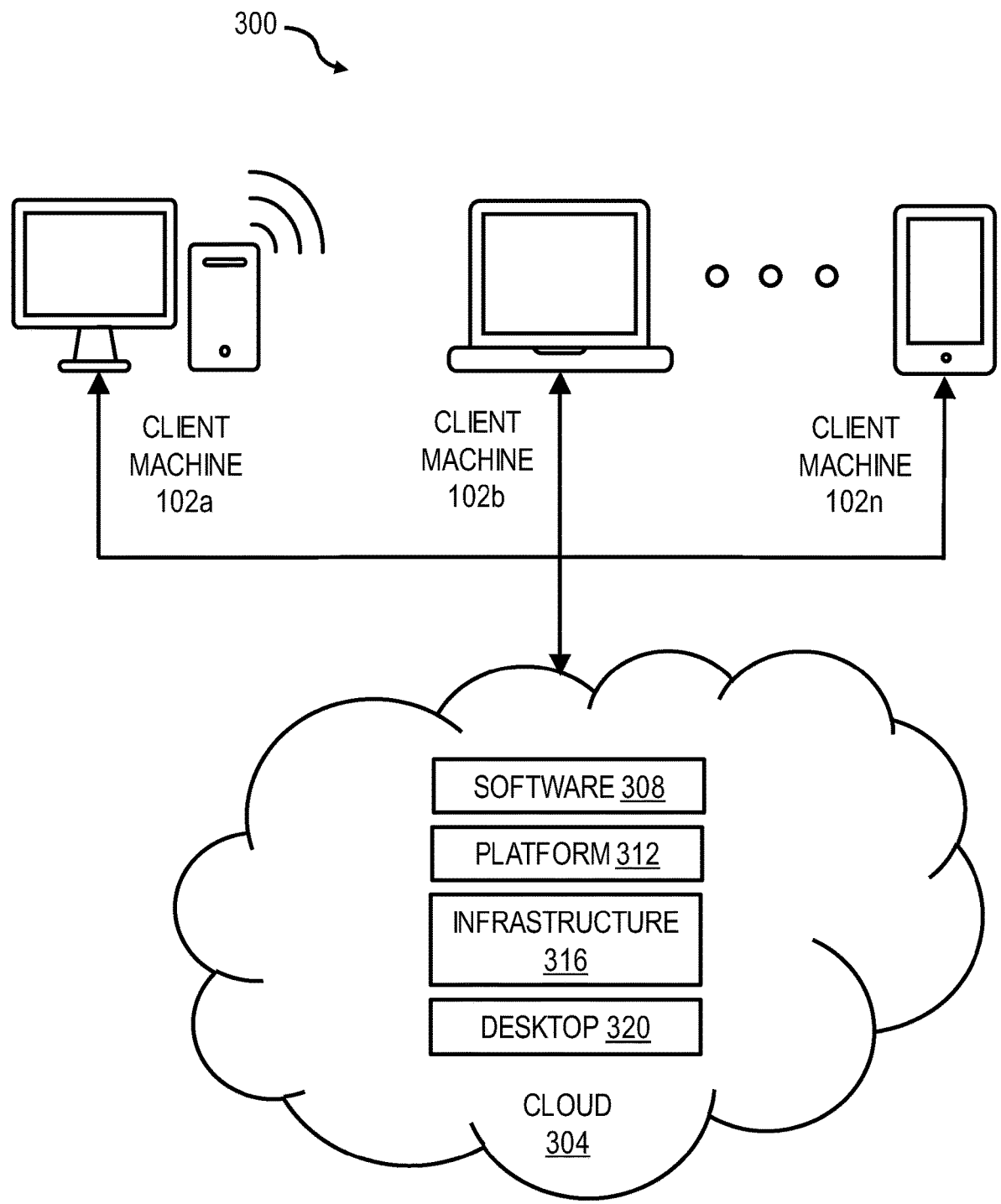
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g., Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
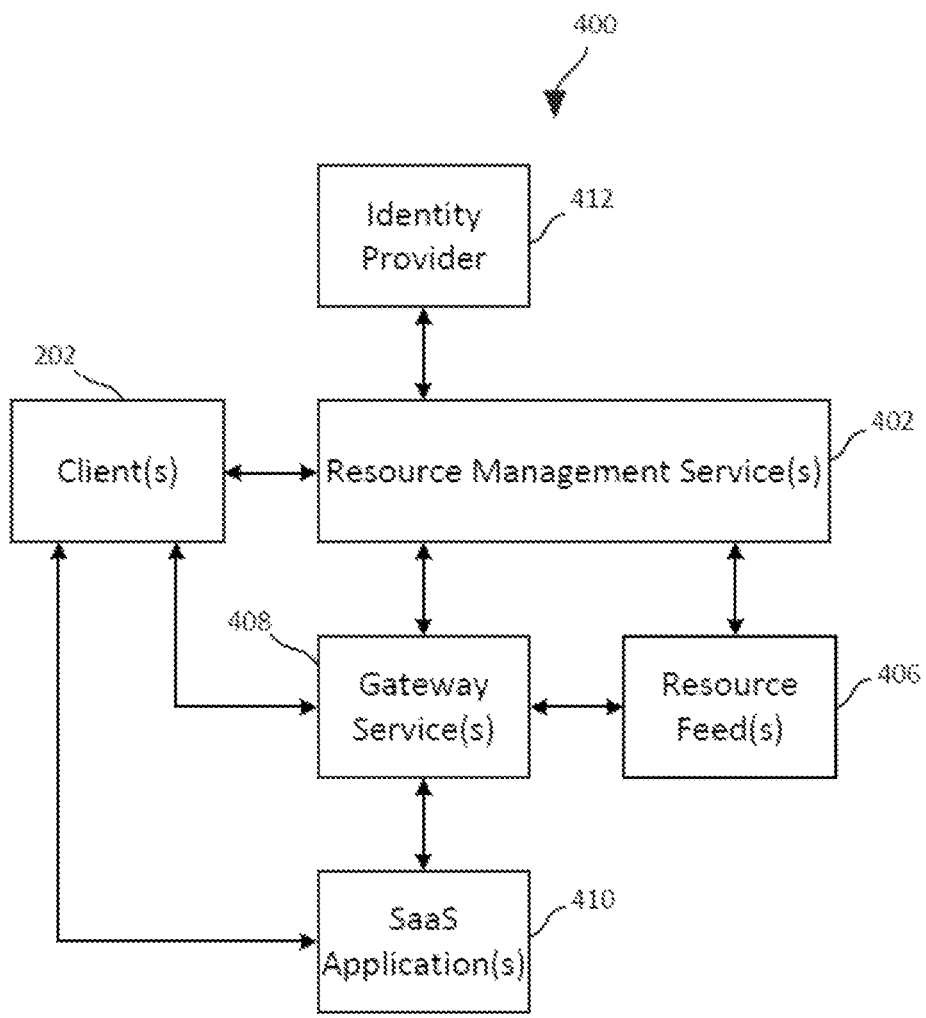
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
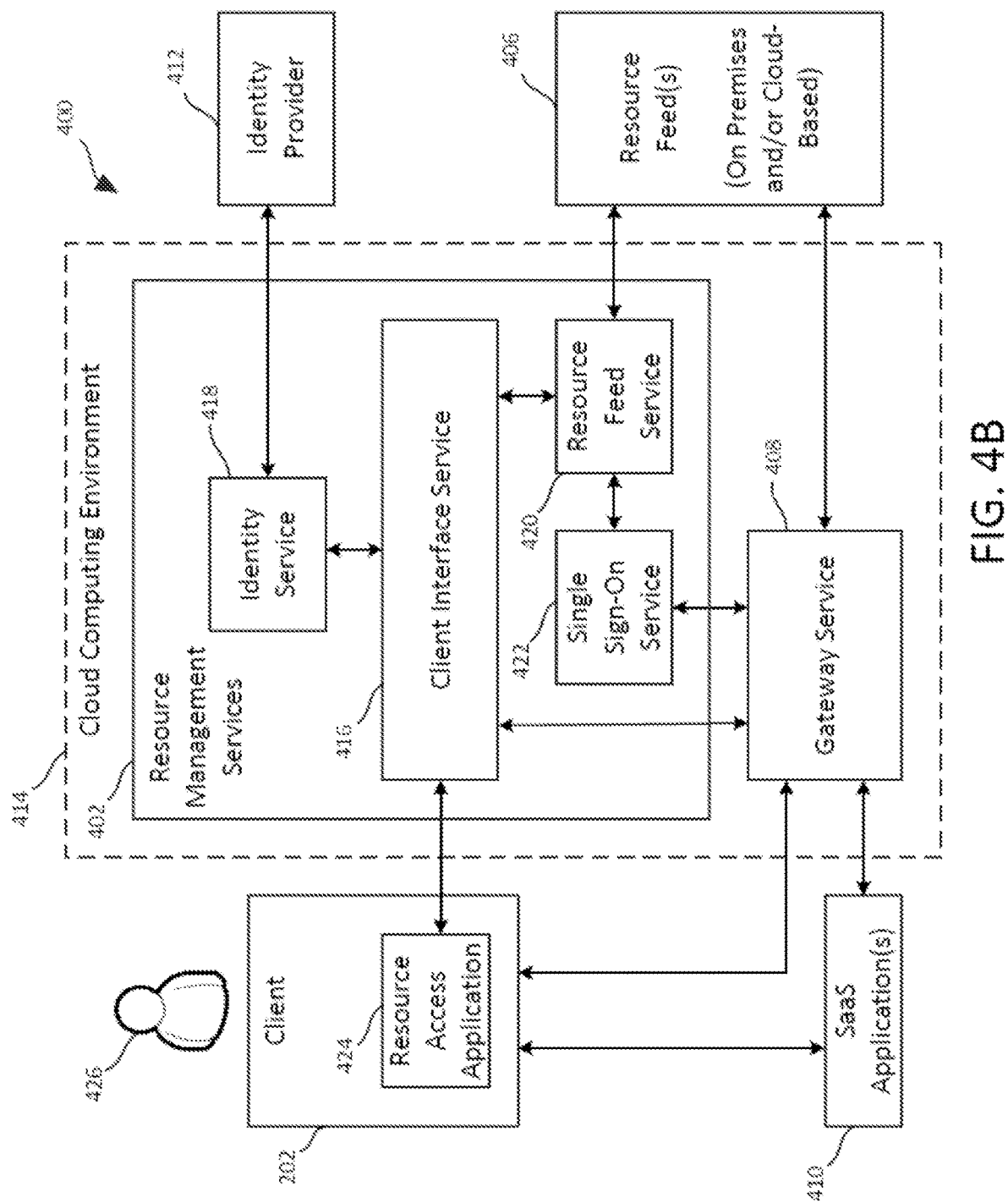
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
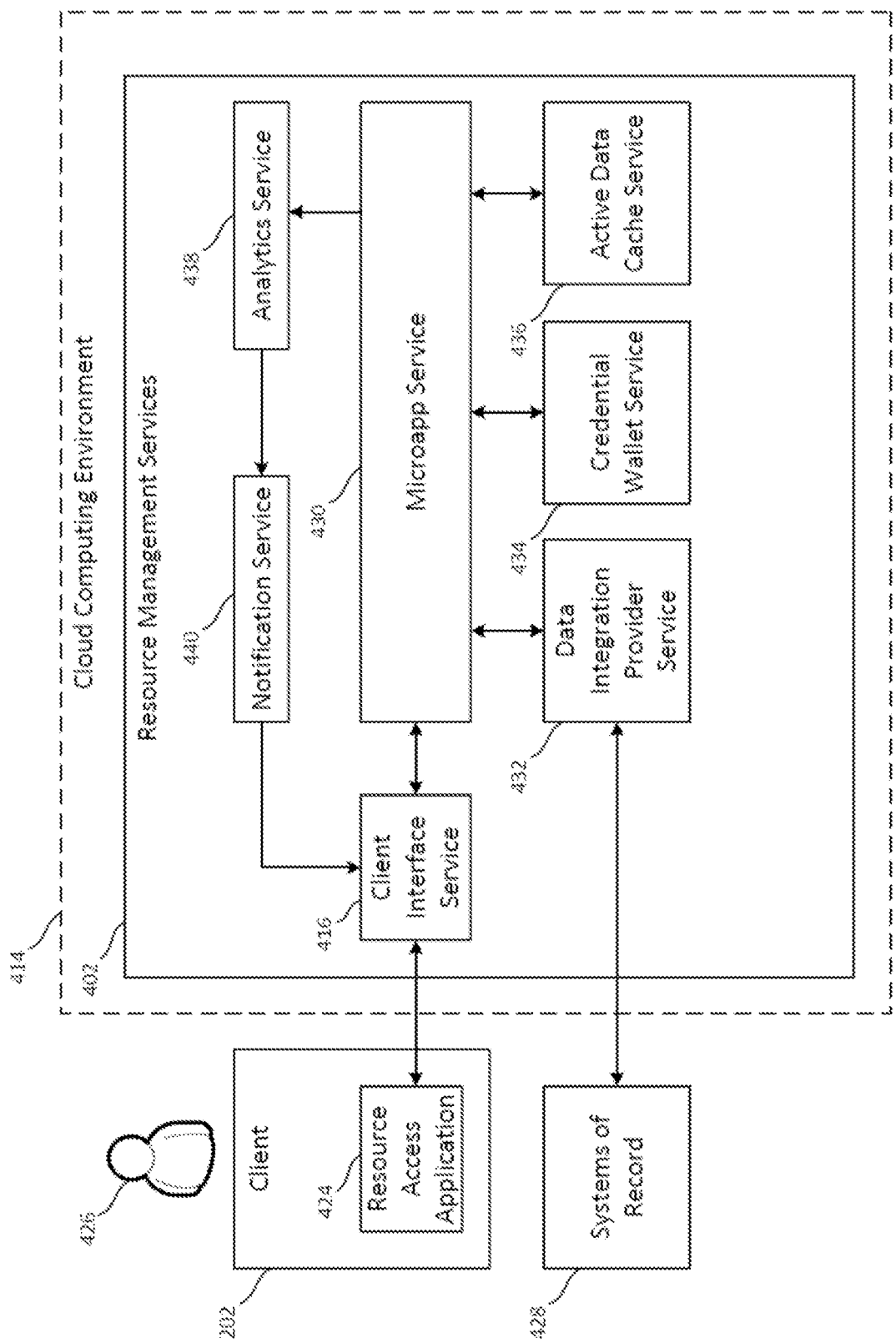
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
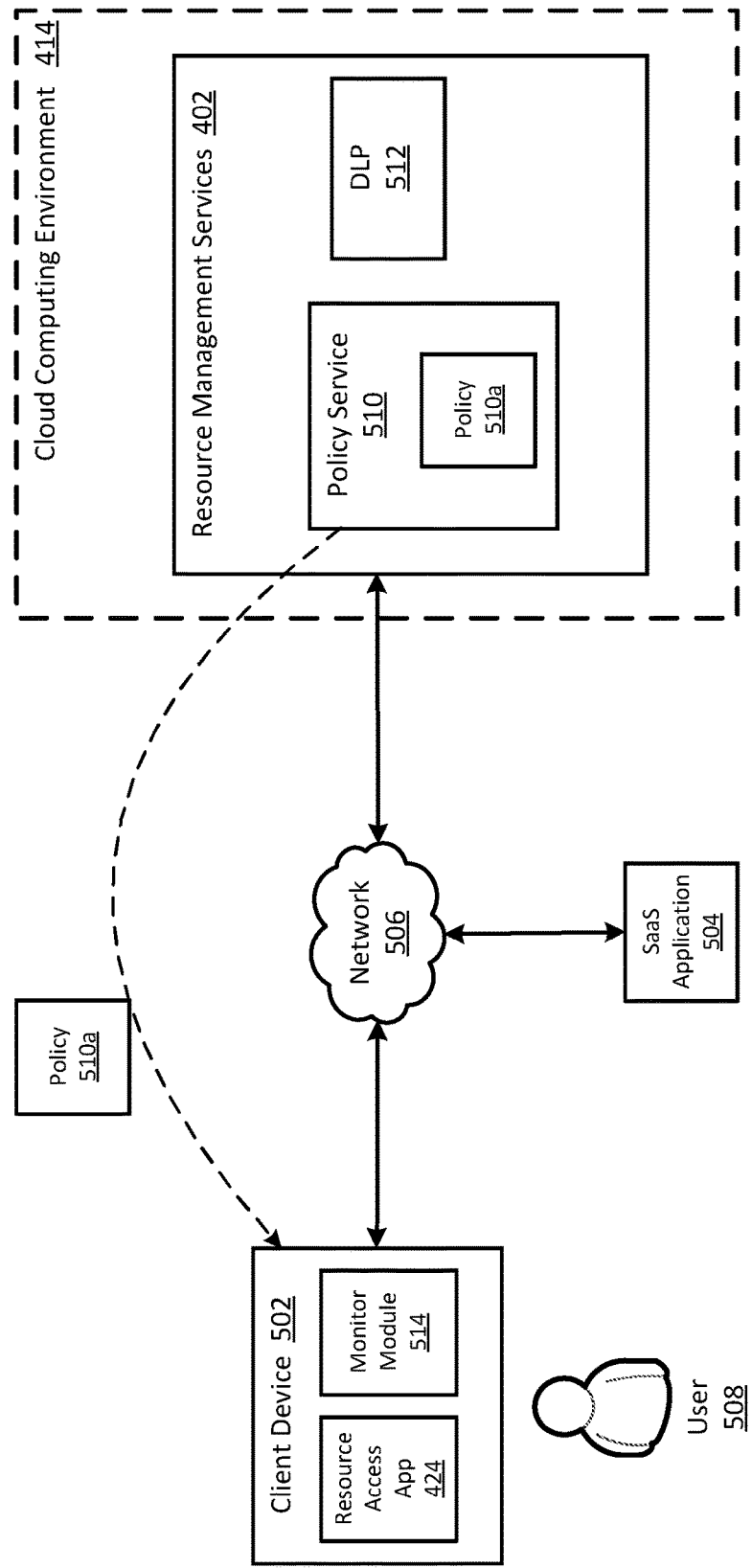
FIG. 5 is a block diagram of an example network environment in which a client device can prevent transfer of sensitive information, in accordance with an embodiment of the present disclosure.

FIG. 5 is a block diagram of an example network environment 500 in which a client device can prevent transfer of sensitive information, in accordance with an embodiment of the present disclosure. More specifically, in some embodiments, the client device can be understood as preventing transfer of sensitive information from an application based on insights gleaned from the application or other application(s) (also referred to herein as "application insights") and/or detection of suspicious user activity. In FIG. 5, like elements of system 400 of FIGS. 4A-4C are shown using like reference designators. As such, the previous relevant discussion with respect to features of the like elements shown using like reference designators is equally applicable here, including the previous relevant discussion with respect to client 202, resource access application 424, resource management services 402, and cloud computing environment 414.

As shown in FIG. 5, network environment 500 can include one or more client devices 502, resource management services 402, and a Software-as-a-Service (SaaS) application 504 communicably coupled to one another via a network 506. Network 506 may correspond one or more to wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, and Near Field Communication (NFC) networks. In some embodiments, network 506 may include another network or a portion or portions of other networks.

Network environment 500 may provide services for one or more organizations, with the organizations having one or more users associated with it. A given client device 502 may be assigned to or otherwise associated with a particular user. For example, as shown in FIG. 5, client device 502 may be assigned to, or associated with, a user 508. While only one client device 502 and one corresponding user 508 are shown in FIG. 5, the structures and techniques sought to be protected herein can be applied to any number of organizations, users, and devices.

Client device 502 can include smartphones, tablet computers, laptop computers, desktop computers, or other computing devices configured to run user applications (or "apps"). In some embodiments, client device 502 may be substantially similar to client machine 102 described above in the context of FIGS. 1 and 3, computing device 100 described above in the context of FIG. 2, and/or client 202 described above in the context of FIGS. 4A-4C.

With continued reference to, and as shown in FIG. 5, user 508 may access resource management services 402 and other services and network resources (e.g., SaaS application 504) using resource access application 424 installed on client device 502. As described previously, resource access application 424 and associated components may provide user 508 with a personalized, all-in-one interface enabling seamless access to the user's resources, such as SaaS and web applications, files, virtual Windows applications, virtual Linux applications, desktops, mobile applications, Citrix Virtual Apps and Desktops™, local applications, and other data. In one example, resource access application 424 may be the CITRIX WORKSPACE app. In an implementation, resource access application 424 may include a web browser for accessing web-based SaaS applications along with other types of web apps and websites.

As an example, an organization may upload its documents to cloud storage and allow access to the documents (or information therein) using SaaS application 504. The organization can store and access sensitive content within a cloud computing services (e.g., cloud computing environment 414). For example, a company may store (e.g., as an attachment) documents within a SaaS application, such as SaaS application 504, that include confidential information that, if divulged to unauthorized persons, may cause harm (e.g., financial harm) or other undesirable issues.

As used herein, "sensitive content" refers to any content that includes sensitive information, and "sensitive information" refers to any information that, if not guarded from unauthorized access and unwarranted disclosure, would undermine the information security of an individual or organization. Non-limiting examples of sensitive information include personally identifiable information (PII), protected health information (PHI), financial information for an individual/organization, and information deemed confidential by the individual/organization. Other examples of sensitive information can include contracts, sales quotes, customer contact information (e.g., email addresses), phone numbers, personal information about employees, employee compensation information, etc.

With continued reference to FIG. 5, resource management services 402 may include a policy service 510 and a data loss prevention (DLP) service 512. Policy service 510 can maintain policy and other configuration information related to the one or more organizations operating in network environment 500 including security policies defined by the organizations for enforcement within network environment 500. Via policy service 510, an organization can define security policies related to the organization's applications and content. As shown in FIG. 5, policy service 510 may include a security policy 510a that defines the organization's content protection policy. For example, security policy 510a may define the elements (e.g., user interface elements or Hypertext Markup Language (HTML) elements) in the organization's applications and content (e.g., application pages, documents, and forms, among others) that are associated with information that the organization considers sensitive and which is to be protected when accessed by users (e.g., user 508).

In one example implementation, an authorized user, such as an administrator, may identify the elements in the organization's documents, forms, application pages, etc., that are associated with sensitive information and which should be protected when accessed by users (e.g., user 508) associated with the organization. As one example, the administrator may determine that a specific field that includes a Social Security Number in an employee employment form is sensitive and is to be protected. As another example, the administrator may determine that any field that includes the text "SSN" in its label in any document, page, form, etc., is to be protected. In any case, having determined the elements that are to be protected, the administrator may specify in security policy 510a information, such as one or more attributes of the elements (e.g., identifier attribute, class attribute, path attribute, hierarchy attribute, and the like), that can be used to identify the individual elements.

Additionally or alternatively, in some cases, the administrator may use an application tool to generate security policy 510a. For example, the administrator may execute (or run) the application tool on a computing device and launch an application page. The administrator can then use a mouse (or another suitable pointing device) to select an element in the page that is to be protected. In response, the application tool can determine the attributes of the selected element that are suitable to identify the element and/or information associated with the element and include these attributes in security policy 510a.

Additionally or alternatively, in some cases, the administrator may have access to a computing device and launch an application page. The administrator may then utilize DLP service 512 to determine whether the content in the page contains any items of sensitive information. The content of the page may be in a text-based format (e.g., textual data) or an image-based format (e.g., an image of the content). In the case of an image, DLP service 512 may use optical character recognition (OCR) to convert the image of the content to textual data. It will be appreciated that other methods/techniques of text extraction may also be used (e.g., textual data may be embedded in the content and extracted). In any case, DLP service 512 may scan the content to identify items of sensitive information contained in the content.

For example, DLP service 512 may scan the textual data for certain keywords or phrases, and/or search the textual data using regular expressions, for patterns of characters to identify items of sensitive information contained in the content in the page. Non-limiting examples of sensitive information include any data that could potentially be used to identify a particular individual (e.g., a full name, Social Security number, driver's license number, bank account number, passport number, and email address), financial information regarding an individual/organization, and information deemed confidential by the individual/organization (e.g., contracts, sales quotes, customer contact information, phone numbers, personal information about employees, and employee compensation information). Other pattern recognition techniques may be used to identify items of sensitive information.

DLP service 512 may determine the location of any identified item of sensitive information within the content. For example, in the case of textual content, an OCR process and/or a text extraction process of DLP service 512 may tag recognized words or characters in the content with location data indicating absolute or relative (e.g., with respect to other display elements) display position data, such as coordinates. Then, for identified items of sensitive information, DLP service 512 can provide to the administrator's computing device, for example, a starting and ending character location which contains the item of sensitive information. In the case of an image, for identified items of sensitive information, DLP service 512 can provide to the administrator's computing device, for example, a location of a bounding rectangle (e.g., coordinates of the four corners of the bounding rectangle) that delineates or defines the bounds (e.g., boundary) of the identified item of sensitive information. The administrator can use the location information provided by DLP service 512 to identify the corresponding elements that are to be protected. The administrator can then specify in security policy 510a information, such as one or more attributes of the elements (e.g., identifier attribute, class attribute, path attribute, hierarchy attribute, and the like), that can be used to identify the individual elements that are to be protected.

As a solution to the aforementioned and other technical problems, in some embodiments, client device 502 is programmed to or otherwise includes a monitor module 514 that is configured to detect when a user is accessing content from cloud services or other resources, including network resources, to identify elements in the content to protect, and, depending on an applicable security policy (e.g., security policy 510a), to monitor for operations and/or suspicious activities with respect to the identified elements, and to generate an action to prevent (or otherwise alert a user) of a transfer of sensitive information. Various types of actions can be generated, including preventing copying or cutting of data associated with the element, alerting or otherwise notifying the user, and/or notifying an analytics service, for example.

For example, and according to an embodiment, user 508 may use resource access application 424 executing (or running) on client device 502 to connect to resource management services 402 and access SaaS application 504. When resource access application 424 connects to resource management services 402, security policy 510a may be delivered to client device 502. For example, policy service 510 may send or otherwise provide to client device 502 the security policy 510a. Security policy 510a specifies the elements that have been identified, for example, by the organization, as needing to be protected.

In some embodiments, upon detecting the loading of a document, such as a page of SaaS application 504, monitor module 514 may identify the elements in the loaded document (e.g., loaded application page) that are also specified in security policy 510*a*. The identified elements are the elements in the loaded document that are to be protected. Monitor module 514 may then generate a script or function (e.g., copy event listeners) for the individual identified elements and a corresponding subroutine (e.g., copy event handler) that is executable when the copy event occurs. For example, a copy event listener generated for an element listens for copy actions on the element and is fired (or initiated) when a copy action is initiated on the element and/or the content (data) associated with the element. If an element is a label (e.g., the label "Social Security Number") of a field that contains data (e.g., the specific social security number), a copy event listener generated for the element is fired when a copy action is initiated on the specific social security number contained in the field. As another example, if an element is actual data (e.g., a specific bank account number), a copy event listener generated for the element is fired when a copy action is initiated on the specific bank account number. In any case, the copy event handler is executed when the copy event listener is fired (i.e., when the copy event occurs). In some embodiments, the generated script or function may be a drag event listener that is executable when a drag event (e.g., drag and drop) occurs.

In some embodiments, monitor module 514 may generate a script or function (e.g., a copy event listener) for the root or window of the application. The generated script or function is configured to fire or otherwise be initiated whenever a copy operation is performed on any child of the root or window of the application. Within the script or function, event object handlers may identify the child element where the copy operation occurred.

In some embodiments, monitor module 514 may generate a subroutine (e.g., a copy event handler) that prevents or otherwise stops the copy action that is initiated on the element. In some embodiments, monitor module 514 may generate a copy event handler that sends or otherwise provides to an analytics service, such as analytics service 438 of FIG. 4C, an indication of the copy action initiated on the element. In response, the analytics service can maintain a record of the attempted copy action on the element.

In some embodiments, monitor module 514 can add the data associated with the element on which the copy action was initiated to a list of data items to monitor for suspicious activity. For example, suppose the copy action that was detected was initiated on an element with a value, such as, for example, a social security number "123456789" in a page of SaaS application 504. In this example case, monitor module 514 may monitor the data being input by user 508 to the page of SaaS application 504, or to another page of SaaS application 504, to determine whether the social security number "123456789", or partial matches or variants of the characters "123456789" (e.g., garbled form of "123456789" such as "214365879", "321654987", etc., combinations of portions of "123456789" such as "123123123", "345345345", "456456456", "789789789", etc., characters inserted into "123456789" such as "1q2w3e4r5t6y7u8i9", "123asdf456dsr789", etc., among others), are being input to SaaS application 504. In some example cases, monitor module 514 may monitor the data being input by user 508 to a user interface of an application other than SaaS application 504. In this manner, monitor module 514 can use insights gleaned from one application (e.g., copy action initiated on social security number "123456789" in the page of SaaS application 504) to monitor data being input into another, different application. Monitor module 514 can determine or otherwise categorize such data input as a suspicious activity and, in response to detecting the suspicious activity, initiate an action such as, for example, generating a notification to user 508 informing of the suspicious activity and/or providing to an analytics service, such as analytics service 438 of FIG. 4C, an indication of the suspicious activity, to provide two examples. In an example implementation, monitor module 514 may monitor the data being input by user 508 and the data resulting from the data input by user 508.

In some embodiments, monitor module 514 may identify the elements that are to be protected. For example, upon detecting the loading of a page of SaaS application 504, monitor module 514 may utilize DLP service 512 to determine whether the content in the loaded page contains any items of sensitive information and obtain information regarding the locations of the identified items of sensitive information. Monitor module 514 may then use the location information provided by DLP service 512 to identify the corresponding elements in the loaded page that are to be protected.

In some embodiments, monitor module 514 may monitor and detect changes to the data associated the elements that are to be protected to determine whether suspicious activity is being performed by user 508. For example, if a page of an EXCEL file is loaded, and a cell that contains a phone number is identified as an element in the loaded page that is to be protected, monitor module 514 may monitor the data being input by user 508 into the cell to determine whether a suspicious activity is being performed. To this end, in an example implementation, upon detecting the loading of a page, monitor module 514 may determine or otherwise ascertain the application that was used to load the page (e.g., which, in this example case is an EXCEL application), and, utilizing the application programming interface (API) of the application, determine the format of the data associated with the element. For example, monitor module 514 may ascertain the application that was used to load the page from the window of the application, or, in the case of a virtual application, the protocol used to launch the virtual application. In the above example, monitor module 514 may determine that an EXCEL application was used to load the EXCEL page, and, utilizing the API of the EXCEL application, determine the format of the phone number that is in the cell. For example, monitor module 514 may utilize an object model provided by the application to determine the format of the data, such as the format of the data in the cell. Continuing this example case, monitor module 514 may determine that the format of the phone number in the cell is 10 numeric characters (i.e., 10 characters '0' through '9'). In other words, monitor module 514 may determine that the expected format of the data in the cell (i.e., the cell containing the phone number) is 10 numeric characters.

Having determined the expected format of the data associated with the element, monitor module 514 may monitor the data being input by user 508 to a user interface of the application (e.g., via keystrokes, paste operation, drop operation, and the like) to determine whether the input data causes the format of the data associated with the element to change from the expected format to a format that is no longer an expected format for the element. In other words, monitor module 514 may monitor the format of the data associated with the element to detect a change to a format that is not the expected format for the element.

For instance, continuing the above phone number example, monitor module 514 may monitor the data being input by user 508 to determine whether the input data changes the data already in the cell to a format that is different from the expected format for a phone number (i.e., 10 characters '0' through '9'). For example, suppose the cell includes the characters "2223334444", and the data input by user 508 changes the contents of the cell to the characters "222a333b4444c". In this example case, monitor module 514 may determine that the data input into the cell, "222a333b4444c", is of a format that is different than the expected format for a phone number (i.e., 10 characters '0' through '9'). In other words, monitor module 514 may determine that the data input by user 508 has caused the format of the data in the cell to change to a format that is no longer a legitimate phone number.

In some embodiments, monitor module 514 may determine the expected format of the data from a label or title associated with the data. For example, assuming that the data is included in a cell of a table having a column/row header label "phone number" or "phone", monitor module 514 may determine that the expected format of the data is that of a phone number.

Monitor module 514 can determine or otherwise categorize such data input that causes the data associated with an element to change to a format that is different than the expected format (i.e., that causes the data to change to a format that is no longer the expected format for the associated element) as a suspicious activity and, in response to detecting the suspicious activity, initiate an action such as, for example, generating a notification to user 508 informing of the suspicious activity and/or providing to an analytics service, such as analytics service 438 of FIG. 4C, an indication of the suspicious activity, to provide two examples. In an example implementation, monitor module 514 may utilize a keystroke monitor to monitor the data being input by user 508. In some embodiments, monitor module 514 may determine whether an activity is a suspicious activity based on a comparison of the data before and after the input.

In some embodiments, monitor module 514 may monitor data being input to an application for suspicious activity based on insights gleaned from one or more other applications. For example, upon detecting the loading of a document, such as a page of SaaS application 504, on client device 502, monitor module 514 may identify the elements in the one or more open applications (e.g., the elements in the loaded pages of the one or more open applications) that are also specified in security policy 510*a*. The content (data) associated with the identified elements are the data in the one or more open applications that are to be protected and serve as the insights gleaned from the other application(s). Monitor module 514 may then monitor the data being input to the page of SaaS application 504 to determine whether user 508 is inputting to SaaS application 504 the data associated with the identified elements in the one or more other open applications or partial matches or variants of the data associated with the identified elements in the one or more other open applications. Monitor module 514 can determine or otherwise categorize such data input as a suspicious activity and, in response to detecting the suspicious activity, initiate an action such as, for example, generating a notification to user 508 informing of the suspicious activity and/or providing to an analytics service, such as analytics service 438 of FIG. 4C, an indication of the suspicious activity, to provide two examples.

In an example implementation, monitor module 514 can utilize natural language processing (NLP) technology and/or natural language understanding (NLU) technology to determine whether the input data is a partial match or variant of the data associated with the identified elements in the one or more other open applications. For example, NLP and/or NLU may be utilized to determine whether the input data is a garbled form of the data, combinations of portions of the data, or characters included into the data, among others, as described previously. As another example, NLP and/or NLU may be utilized to determine whether the input data is incomprehensible and/or grammatically incorrect and is determined to contain a match, a partial match, or a variant of that data that is to be protected. For instance, suppose that the data to be protected is a phone number "123456789". In this example case, NLP and/or NLU may be utilized to detect input data such as, by way of examples, "this is a test 123456789", "th1is 23 is 4a5 6te78st9", "on tw thr fo fi si sev eig ni", or "oen tow there fuor five sxi seven eight nien". Note that this is possible since NLP and NLU provides for correction of word spellings and completion of incomplete words.

For example, suppose that an EXCEL application is open on client device 502, and a cell that contains a bank account number "12345" is identified as an element in a loaded page of the open EXCEL application that is to be protected. Also suppose that user 508 is using an email application on client device 502 to compose an email message. In this example case, monitor module 514 may monitor the data being input by user 508 to the email application to determine whether the characters "1", "2", "3", "4", "5", partial matches or variants of the characters "1", "2", "3", "4", "5" (e.g., incomplete or garbled form of the characters "1", "2", "3", "4", "5"), or encodings of the characters "1", "2", "3", "4", "5" (e.g., "1 a", "2b", "3c", "4d", "5e") are being input to the email application (e.g., being input to compose the email). If monitor module 514 determines that user 508 inputs the characters "1", "2", "3", "4", "5" or partial matches or variants of the characters "1", "2", "3", "4", "5" to the email application, monitor module 514 can determine or otherwise categorize such data input by user 508 as a suspicious activity.

In some embodiments, monitor module 514 may monitor data being input to an application for suspicious activity based on insights gleaned from one or more other applications and previous data inputs. In brief, the insights gleaned from the other applications and a user's previous input data are used to detect a pattern or encoding scheme that the user may be employing to evade detection, and the detected pattern or encoding scheme is used to determine whether a subsequent suspicious activity is being performed. Note that the user's previous input data may not have been detected as a suspicious activity.

In an example implementation, while monitoring the data being input to an application, such as SaaS application 504, by user 508, monitor module 514 may use the input data to learn one or more modification schemas which indicate a pattern or encoding scheme that may be being applied by user 508 to the data associated with the elements that are being protected at the time of data input. Monitor module 514 may then store the learned modification schemas in a suitable memory device for subsequent use. Subsequently, upon detecting the loading of a document, such as a page of SaaS application 504, on client device 502, monitor module 514 may identify the elements in the one or more open applications (e.g., the elements in the loaded pages of the one or more open applications) that are also specified in security policy 510a. Monitor module 514 may then retrieve the previously stored modification schemas and apply the modification schemas to the data associated with the identified elements (e.g., the elements in the loaded pages of the one or more open applications that are also specified in security policy 510a) to generate encoded data. Monitor module 514 may then monitor the data being input to the page of SaaS application 504 to determine whether user 508 is inputting to SaaS application 504 the encoded data or partial matches or variants of the encoded data. In this manner, the generated modified data may also be used to determine whether a suspicious activity is being performed. Note that, in some implementations, monitor module 514 may also monitor the data being input to the page of SaaS application 504 to determine whether user 508 is inputting to SaaS application 504 the data associated with the identified elements in the one or more other open applications or partial matches or variants of the data associated with the identified elements in the one or more other open applications.

For example, suppose that a web application is open on client device 502, and a personal identification number "4", "6", "7" is identified as an element in a loaded page of the open web application that is to be protected. Also suppose that user 508 is using an email application on client device 502 to compose an email message, and user 508 has input to the email application the characters "11", "7", and "9". From the personal identification number that is to be protected (i.e., "4", "6", "7") and the data input to the email application by user 508 (i.e., the characters "11", "7", and "9"), monitor module 514 may learn a modification schema "7", "1", "2" (i.e., 11−4=7, 7−6=1, and 9−7=2). It is appreciated that monitor module 514 may learn additional modification schemas as additional patterns and encoding schemes may be discovered from the data that is to be protected and the data input by user 508. In addition, other elements may have been identified for protection and/or additional data may have been input by user 508. Also note that monitor module 514 may not detect the inputting of the characters "11", "7", and "9" by user 508 as a suspicious activity. In any case, monitor module 514 may store the learned modification schema "7", "1", "2", in a suitable memory device for subsequent use.

As another example, suppose that "12345" is identified as the number that is to be protected. A user may use their date of birth, 11 Jan. 1980 (i.e., "11180") as a schema, add the schema to the number "12345" which results in the number "23525", and input the resulting number "23525". Monitor module 514 can perform the subtraction to determine the schema "11180". Now, suppose that "54321" is subsequently identified as the number that is to be protected. The user may add the same schema to the number to arrive at the number "65501" (i.e., "54321"+"11180"), and input the resulting number "65501". Monitor module 514 can subtract the previously determined schema (i.e., "11180") from the input number "65501" to arrive at the number "54321" (i.e., "65501"-"11180"), and determine that the number input by the user matches the content/data (i.e., "54321") that is to be protected.

As another example, a user may replace the characters in the data that is to be protected using a key. For example, the character "1" may be replaced with the character "a", the character "2" may be replaced with the character "b", the character "3" may be replaced with the character "c", and so on. Using techniques explained above, monitor module 514 can determine a schema that is being used by the user from the user's prior data inputs, and use the schema to determine whether an input by the user is a suspicious activity.

Continuing the "7", "1", "2" schema example above, suppose that an EXCEL application is now open on client device 502, and a cell that contains an identification number "3", "4", "5" is identified as an element in a loaded page of the open EXCEL application that is to be protected. Also suppose that user 508 is using an email application on client device 502 to compose an email message (e.g., another email message). In this example case, monitor module 514 may retrieve and apply the modification schema, "7", "1", "2", to the identification number "345" to generate encoded data "10", "5", "7" (i.e., 3+7=10, 4+1=5, and 5+2=7). Monitor module 514 may then monitor the data being input by user 508 to the email application to determine whether the characters "10", "5", "7", or partial matches or variants of the characters "10", "5", "7" (e.g., incomplete or garbled form of the characters "10", "5", "7"), are being input to the email application (e.g., being input to compose the email). Monitor module 514 may also monitor the data being input by user 508 to the email application to determine whether the characters "3", "4", "5", or partial matches or variants of the characters "3", "4", "5" (e.g., incomplete or garbled form of the characters "3", "4", "5"), are being input to the email application (e.g., being input to compose the email). If monitor module 514 determines that user 508 inputs the characters "10", "5", "7" or the characters "3", "4", "5", or partial matches or variants of these characters to the email application, monitor module 514 can determine or otherwise categorize such data input by user 508 as a suspicious activity.

Figure 6:
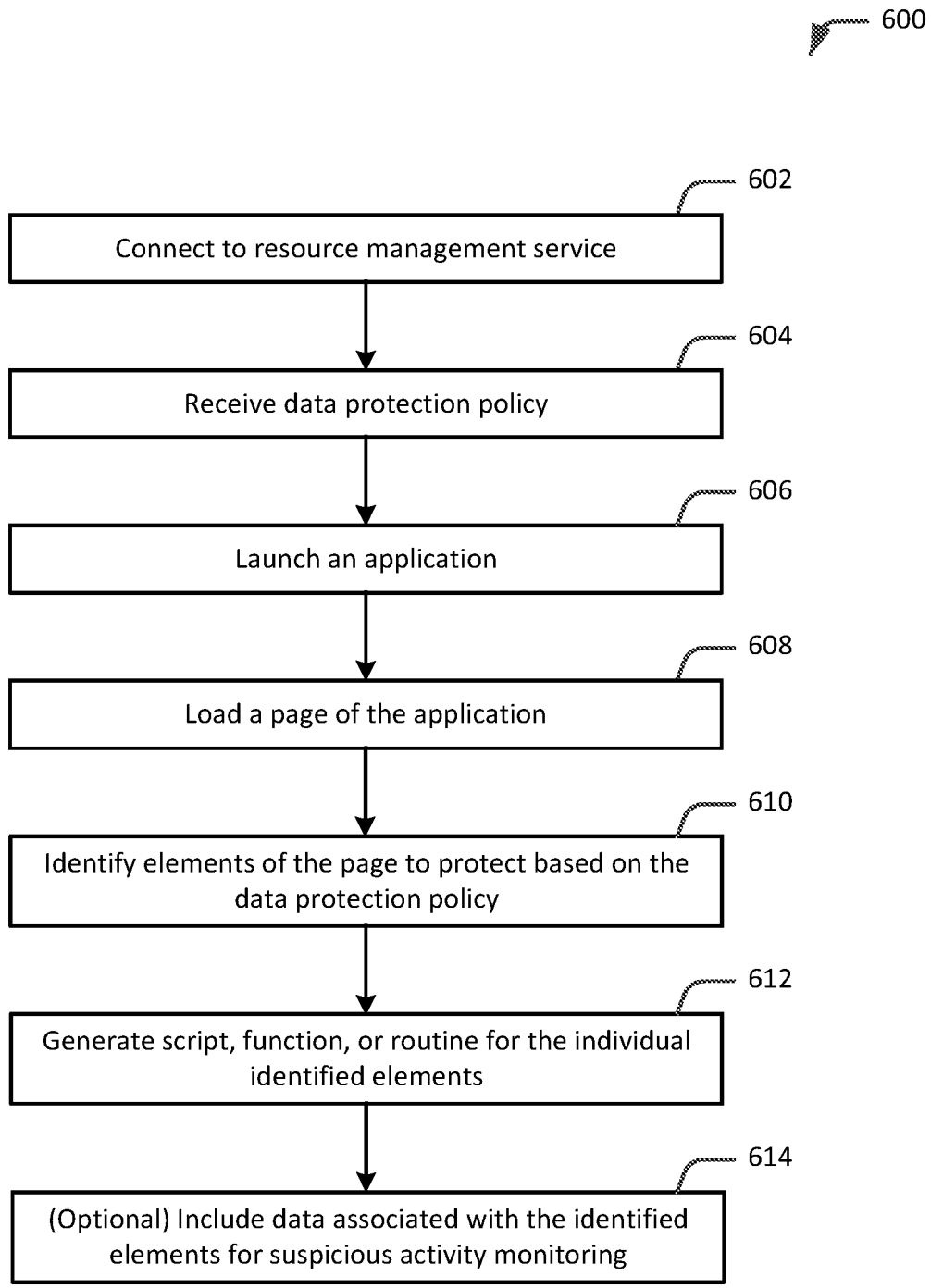
FIG. 6 is a flow diagram of an example process for preventing transfer of sensitive information from an application, in accordance with an embodiment of the present disclosure.

FIG. 6 is a flow diagram of an example process 600 or preventing transfer of sensitive information from an application using scripts or functions (e.g., event listeners) associated or otherwise actionable with elements of a user interface (UI) of the application, in accordance with an embodiment of the present disclosure. Example process 600, and example processes 700, 800, and 900 further described below, may be implemented or used within a computing environment or system such as those disclosed above at least with respect to FIG. 1, FIG. 2, FIG. 3, FIGS. 4A-4C and/or FIG. 5. For example, in some embodiments, the operations, functions, or actions illustrated in example process 600, and example processes 700, 800, and 900 further described below, may be stored as computer-executable instructions in a computer-readable medium, such as volatile memory 122 and/or non-volatile memory 128 of computing device 100 of FIG. 2 (e.g., computer-readable medium of client machines 102 of FIG. 1, client machines 102a-102n of FIG. 3, clients 202 of FIGS. 4A-4C, and/or client device 502 of FIG. 5). For example, the operations, functions, or actions described in the respective blocks of example process 600, and example processes 700, 800, and 900 further described below, may be implemented by applications 116 and/or data 117 of computing device 100.

With reference to process 600 of FIG. 6, at 602, a user, such as user 508, may execute resource access application 424 on client device 502, and use resource access application 424 to connect to resource management services 402. At 604, upon connecting to resource management services 424, client device 502 may receive security policy 510a. For example, policy service 510 of resource management services 402 may send or otherwise provide to client device 502 the security policy 510a. Security policy 510a specifies the elements that have been identified, for example, by the organization, as needing to be protected.

At 606, user 508 may use resource access application 424 executing on client device 502 to launch an application, such as SaaS application 504. At 608, client device 502 may load a page of the launched SaaS application 504. At 610, upon detecting the loading of the page of SaaS application 504, monitor module 504 on client device 502 may identify the elements in the loaded page of SaaS application 504 that are also specified in security policy 510a. The content associated with the identified elements are the data in the loaded page that are to be protected.

At 612, monitor module 514 may generate a script, function, or routine (e.g., copy event listeners) for the individual identified elements and a corresponding script or subroutine (e.g., copy event handler) executable when the copy event occurs. The generated routines may prevent or otherwise stop a copy action that may be initiated on the identified elements, for example, by user 508. In the case a routine generated for an element is fired or otherwise initiated, at 614, monitor module 514 may optionally include the data associated with the element on which the copy action was initiated to a list of data items to monitor for suspicious activity. In some embodiments, monitor module 514 may include the data associated with the elements to the list of data items to monitor for suspicious activity regardless of the initiation of the copy action.

Figure 7:
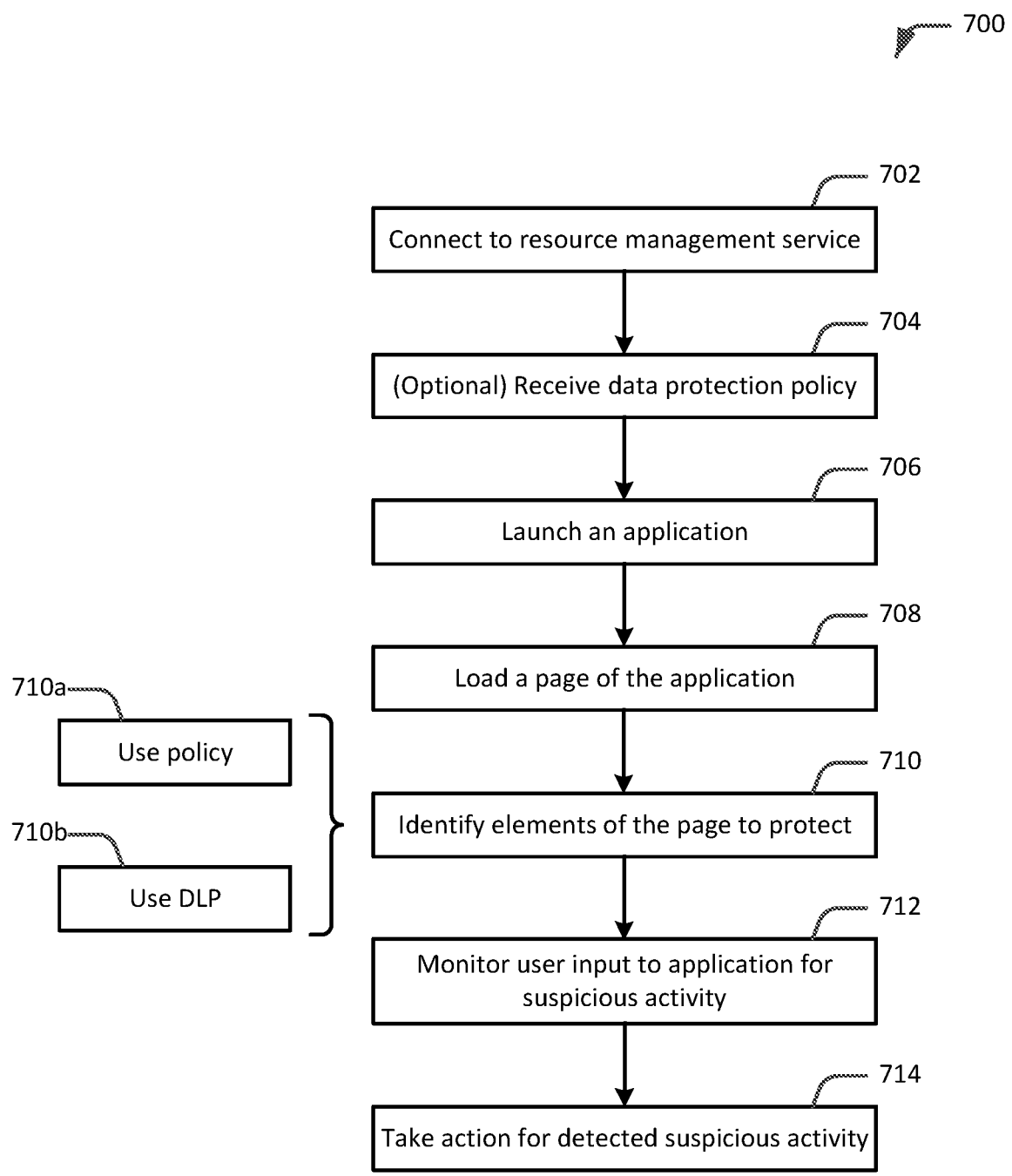
FIG. 7 is a flow diagram of an example of another process for preventing transfer of sensitive information from an application, in accordance with an embodiment of the present disclosure.

FIG. 7 is a flow diagram of an example of another process 700 for preventing transfer of sensitive information from an application, in accordance with an embodiment of the present disclosure. At 702, a user, such as user 508, may execute resource access application 424 on client device 502, and use resource access application 424 to connect to resource management services 402. At 704, upon connecting to resource management services 424, client device 502 may optionally receive security policy 510a. For example, policy service 510 of resource management services 402 may send or otherwise provide to client device 502 the security policy 510a. Security policy 510a specifies the elements that have been identified, for example, by the organization, as needing to be protected.

At 706, user 508 may use resource access application 424 executing on client device 502 to launch an application, such as SaaS application 504. At 708, client device 502 may load a page of the launched SaaS application 504. At 710, upon detecting the loading of the page of SaaS application 504, monitor module 504 on client device 502 may identify the elements in the loaded page of SaaS application 504 that are to be protected. For instance, if security policy 510a was provided to client device 502, monitor module 504 may identify the elements in the loaded page of SaaS application 504 that are also specified in security policy 510a (710a). Additionally or alternatively, monitor module 504 may utilize a DLP service, such as DLP service 512 of resource management services 402, to identify one or more elements associated with items of sensitive information in the loaded page (710b). The content associated with the identified elements are the data in the loaded page that are to be protected.

At 712, monitor module 514 may monitor the data being input by user 508 to the loaded page of SaaS application 504 for suspicious activity. For example, monitor module 514 may monitor the data being input by user 508 to a user interface of SaaS application 504 to determine whether the input data causes the format of the data associated with any one of the identified elements to change from an expected format to a format that is no longer an expected format for the element. At 714, upon detecting a suspicious activity based on the monitored input data, monitor module 514 may initiate an action (e.g., a mediation action). For example, monitor module 514 may generate a notification to user 508 informing of the suspicious activity and/or provide to an analytics service an indication of the suspicious activity.

Figure 8:
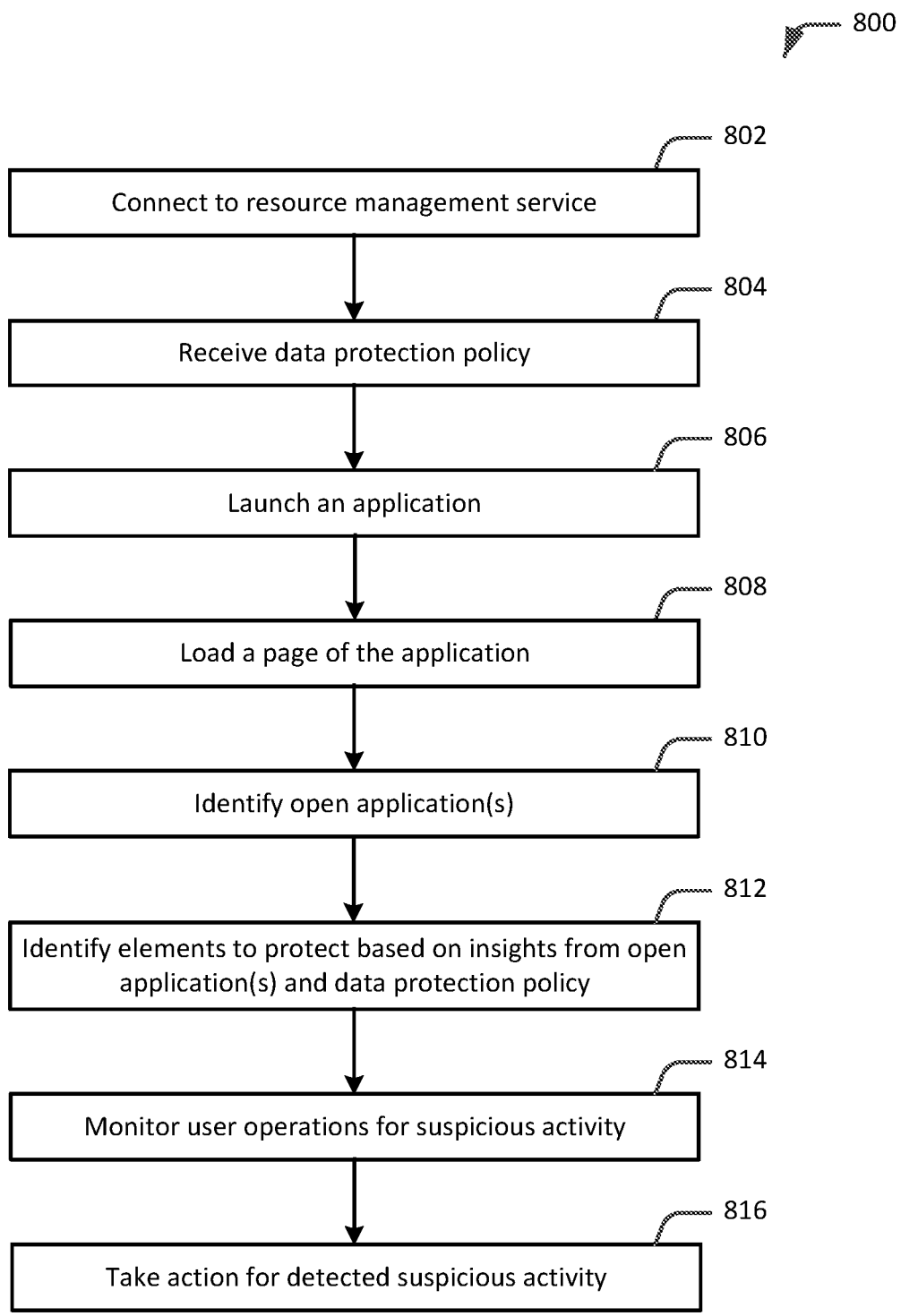
FIG. 8 is a flow diagram of an example of yet another process for preventing transfer of sensitive information from an application, in accordance with an embodiment of the present disclosure.

FIG. 8 is a flow diagram of an example of yet another process 800 for preventing transfer of sensitive information from an application, in accordance with an embodiment of the present disclosure. At 802, a user, such as user 508, may execute resource access application 424 on client device 502, and use resource access application 424 to connect to resource management services 402. At 804, upon connecting to resource management services 424, client device 502 may receive a policy (e.g., security policy 510a). For example, policy service 510 of resource management services 402 may send or otherwise provide to client device 502 the security policy 510a. Security policy 510a specifies the elements that have been identified, for example, by the organization, as needing to be protected.

At 806, user 508 may use resource access application 424 executing on client device 502 to launch an application, such as a web application. At 808, client device 502 may load a page of the launched web application. At 810, monitor module 504 on client device 502 may identify one or more applications that are opened on client device 502. At 812, monitor module 504 may identify the elements in the loaded pages of the one or more opened applications that are also specified in security policy 510a. The content associated with the identified elements are the data in the one or more open applications that are to be protected and serve as the insights gleaned from the other application(s).

At 814, monitor module 514 may monitor the data being input by user 508 to the loaded page of web application for suspicious activity. For example, monitor module 514 may monitor the data being input to the loaded page of the web application to determine whether user 508 is inputting to the web application the data associated with the identified elements in the one or more other open applications or partial matches or variants of the data associated with the identified elements in the one or more other open applications. At 816, upon detecting a suspicious activity based on the monitored input data, monitor module 514 may initiate an action (e.g., a mediation action). For example, monitor module 514 may generate a notification to user 508 informing of the suspicious activity and/or provide to an analytics service an indication of the suspicious activity.

Figure 9:
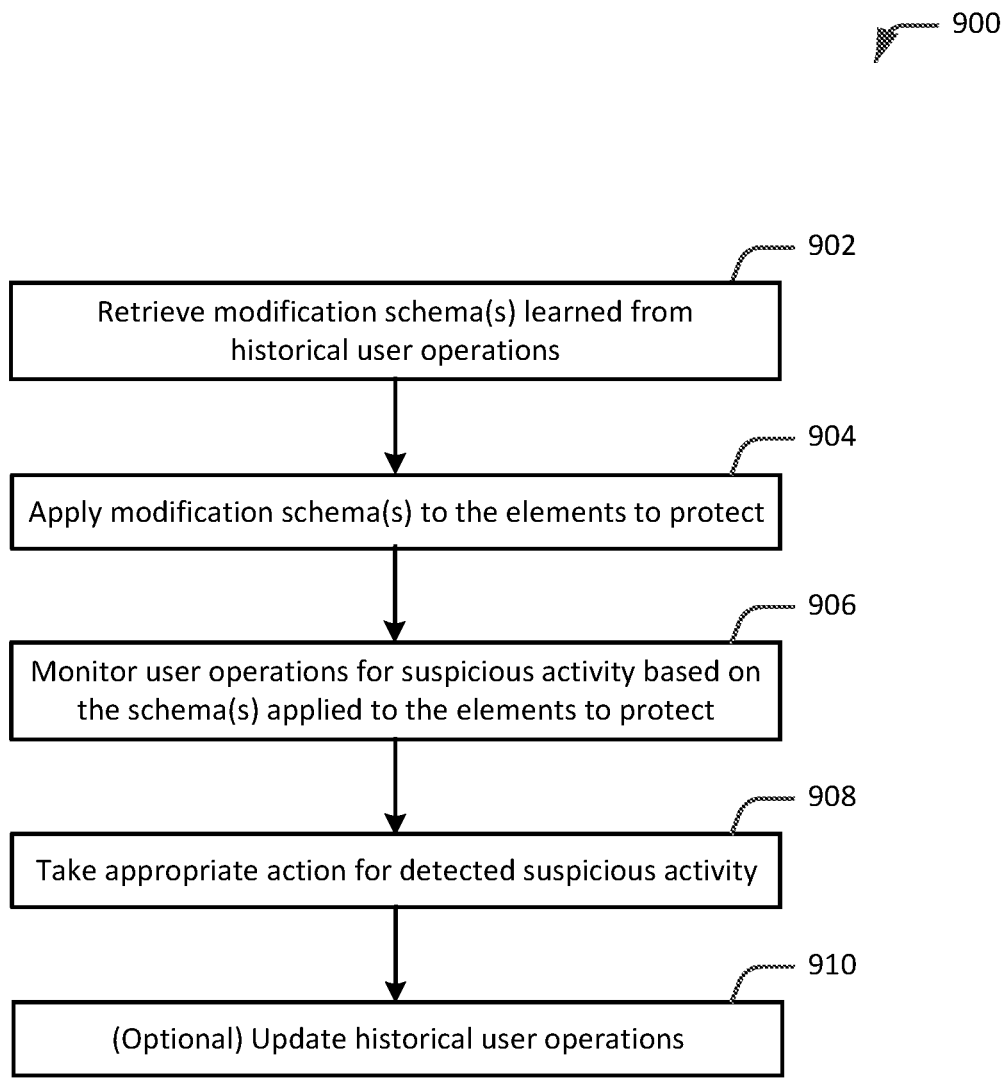
FIG. 9 is a flow diagram of an example of another process for preventing transfer of sensitive information from an application, in accordance with an embodiment of the present disclosure.

FIG. 9 is a flow diagram of an example of another process 900 for preventing transfer of sensitive information from an application, in accordance with an embodiment of the present disclosure. In an example scenario, a user, such as user 508, may execute resource access application 424 on client device 502, and use resource access application 424 to connect to resource management services 402. Upon connecting to resource management services 424, client device 502 may receive security policy 510a, which specifies the elements that have been identified, for example, by the organization, as needing to be protected. User 508 may then use resource access application 424 executing on client device 502 to launch a web application and load a page of the launched web application. At about the same time, monitor module 504 on client device 502 may identify any applications that are opened on client device 502 and identify the elements in the loaded pages of the opened applications that are also specified in security policy 510a. The content associated with the identified elements are the data in the one or more open applications that are to be protected and serve as the insights gleaned from the other application(s).

With continued reference to process 900, at 902, monitor module 514 may retrieve the modification schemas learned from the previous data input by user 508. These modification schemas define the patterns or encoding schemes that user 508 may be employing to evade detection of suspicious activity. At 904, monitor module 514 may apply the modification schemas to the data associated with the identified elements (e.g., the elements in the loaded pages of the open applications that are also specified in security policy 510a) to generate encoded data. The generated encoded data may be used to determine whether suspicious activity is being performed by user 508.

At 906, monitor module 514 may monitor the data being input by user 508 to the loaded page of web application for suspicious activity. For example, monitor module 514 may monitor the data being input to the loaded page of the web application to determine whether user 508 is inputting to the web application the encoded data or partial matches or variants of the encoded data. Monitor module 514 may also monitor the data being input to the loaded page of the web application to determine whether user 508 is inputting to the web application the data associated with the identified elements in the other open applications or partial matches or variants of the data associated with the identified elements in the other open applications.

At 908, upon detecting a suspicious activity based on the monitored input data, monitor module 514 may initiate an action (e.g., a mediation action). For example, monitor module 514 may generate a notification to user 508 informing of the suspicious activity and/or provide to an analytics service an indication of the suspicious activity. At 910, monitor module 514 may optionally include the data input to the loaded page to a list of historical operations being maintained for user 508. The list of historical operations contains the previous data input by user 508 and may be used to detect additional patterns or encoding schemes.

Further Example Embodiments

The following examples pertain to further embodiments, from which numerous permutations and configurations will be apparent.

Example 1 includes a method including: monitoring, by a computing device, an application for suspicious activity based on keystrokes to input data to the application; detecting, by the computing device, an instance of suspicious activity within the application based on a sequence of keystrokes to input the data to the application, the sequence of keystrokes to provide characters indicative of sensitive data and in a format different than an expected format for the input data; and generating, by the computing device, an action to prevent loss of sensitive data in response to detection of the instance of suspicious activity.

Example 2 includes the subject matter of Example 1, wherein the data is input in a field of the UI of the application.

Example 3 includes the subject matter of Example 1, further comprising identifying an element of the application, wherein the sequence of keystrokes causes a change to data associated with the element of the application.

Example 4 includes the subject matter of Example 3, wherein the element of the application is identified using a data loss prevention (DLP) service.

Example 5 includes the subject matter of any of Examples 1 through 4, wherein the detecting of the format different than the expected format for the input data is by one of natural language processing (NLP) or natural language understanding (NLU).

Example 6 includes the subject matter of any of Examples 1 through 5, wherein generating the action includes disabling an operation to copy the data from the application so as to prevent an unauthorized transfer of sensitive information from the application.

Example 7 includes the subject matter of any of Examples 1 through 6, wherein generating the action includes generating a notification to a user of the application.

Example 8 includes the subject matter of any of Examples 1 through 7, wherein generating the action includes generating a notification to an analytics service.

Example 9 includes the subject matter of any of Examples 1 through 8, wherein the application is a first application, and wherein the expected format for the input data is determined from an element of a UI of a second application that is open on the computing device.

Example 10 includes a system including a memory and one or more processors in communication with the memory and configured to: monitor an application for suspicious activity based on keystrokes to input data to the application; detect an instance of suspicious activity within the application based on a sequence of keystrokes to input the data to the application, the sequence of keystrokes to provide characters indicative of sensitive data and in a format different than an expected format for the input data; and generate an action to prevent loss of sensitive data in response to detection of the instance of suspicious activity.

Example 11 includes the subject matter of Example 10, wherein the data is input in a field of a user interface (UI) of the application.

Example 12 includes the subject matter of Example 10, wherein the one or more processors are further configured to identify an element of the application, wherein the sequence of keystrokes causes a change to data associated with the element of the application.

Example 13 includes the subject matter of Example 11, wherein the element of the application is identified using a data loss prevention (DLP) service.

Example 14 includes the subject matter of any of Examples 10 through 13, wherein to detect the format different than the expected format for the input data is by one of natural language processing (NLP) or natural language understanding (NLU).

Example 15 includes the subject matter of any of Examples 10 through 14, wherein to generate the action comprises to disable an operation to copy the data from the application so as to prevent an unauthorized transfer of sensitive information from the application.

Example 16 includes the subject matter of any of Examples 10 through 15, wherein to generate the action comprises to generate a notification to a user of the application.

Example 17 includes the subject matter of any of Examples 10 through 16, wherein to generate the action comprises to generate a notification to an analytics service.

Example 18 includes the subject matter of any of Examples 10 and 17, wherein the application is a first application, and wherein the expected format for the input data is determined from an element of a UI of a second application that is open on the computing device.

Example 19 includes a method including: identifying, by a computing device, an element of a first application to protect from data loss; generating, by the computing device, an event listener for the identified element of the first application; detecting, by the computing device, an instance of suspicious activity within the first application based on user operations with the first application and associated with the identified element of the first application; and generating, by the computing device, an action to prevent loss of sensitive data in response to detection of the instance of suspicious activity.

Example 20 includes the subject matter of Example 19, wherein the event listener is a copy event listener, the copy event listener being triggered in response to a copy action on the identified element of the first application so as to prevent an unauthorized transfer of sensitive information from the first application.

Example 21 includes the subject matter of any of Examples 19 and 20, wherein the user operations on the element of the first application cause a modification of data associated with the element to a format different than an expected format for the element.

Example 22 includes the subject matter of Examples 21, wherein the expected format for the element of the first application is determined from an element of a second application that is open on a display of the computing device.

Example 23 includes the subject matter of any of Examples 19 through 22, wherein detecting the instance of suspicious activity within the first application is by one of natural language processing (NLP) or natural language understanding (NLU).

Example 24 includes the subject matter of any of Examples 19 through 23, wherein the element of the first application is identified using a data loss prevention (DLP) service.

Example 25 includes the subject matter of any of Examples 19 through 24, wherein generating the action includes generating a notification to one of a user of the application or an analytics service.

Example 26 includes a system including a memory and one or more processors in communication with the memory and configured to: identify an element of a first application to protect from data loss; generate an event listener for the identified element of the first application; detect an instance of suspicious activity within the first application based on user operations with the first application and associated with the identified element of the first application; and generate an action to prevent loss of sensitive data in response to detection of the instance of suspicious activity.

Example 27 includes the subject matter of Example 26, wherein the event listener is a copy event listener, the copy event listener being triggered in response to a copy action on the identified element of the first application so as to prevent an unauthorized transfer of sensitive information from the first application.

Example 28 includes the subject matter of any of Examples 26 and 27, wherein the user operations on the element of the first application cause a modification of data associated with the element to a format different than an expected format for the element.

Example 29 includes the subject matter of Example 28, wherein the expected format for the element of the first application is determined from an element of a second application that is open on a display of the computing device.

Example 30 includes the subject matter of any of Examples 26 through 29, wherein to detect the instance of suspicious activity within the first application is by one of natural language processing (NLP) or natural language understanding (NLU).

Example 31 includes the subject matter of any of Examples 26 through 30, wherein the element of the first application is identified using a data loss prevention (DLP) service.

Example 32 includes the subject matter of any of Examples 26 through 31, to generate the action comprises to generate a notification to one of a user of the application or an analytics service.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modules executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
    monitoring, by a computing device, a first application for suspicious activity based on keystrokes to input data to a field in a user interface of the first application, wherein the field is associated with sensitive information;
    detecting, by the computing device, an instance of suspicious activity within the first application based on a sequence of keystrokes, received by the computing device, to input the data to the field in the user interface of the first application, the sequence of keystrokes to provide characters indicative of sensitive data and in a format different than an expected format for the field in the user interface of the first application, wherein the sequence of keystrokes causes a change to format of data already in the field prior to the receiving of the sequence of keystrokes to input the data, and wherein the expected format for the field is determined from a user interface element of a second application that is open on the computing device; and
    generating, by the computing device, an action to prevent loss of sensitive data in response to detection of the instance of suspicious activity.

2. The method of claim 1, wherein the field in the user interface of the first application is identified using a data loss prevention (DLP) service.

3. The method of claim 1, wherein the detecting of the format different than the expected format for the field in the user interface of the first application is by one of natural language processing (NLP) or natural language understanding (NLU).

4. The method of claim 1, wherein generating the action includes disabling an operation to copy the data from the first application so as to prevent an unauthorized transfer of sensitive information from the first application.

5. The method of claim 1, wherein generating the action includes generating a notification to one of a user of the first application or an analytics service.

6. A system comprising:
    a memory; and
    one or more processors in communication with the memory and configured to:
        monitor a first application on a computing device for suspicious activity based on keystrokes to input data to a field in a user interface of the first application, wherein the field is associated with sensitive information;
        detect an instance of suspicious activity within the first application based on a sequence of keystrokes, received by the computing device, to input the data to the field in the user interface of the first application, the sequence of keystrokes to provide characters indicative of sensitive data and in a format different than an expected format for the field in the user interface of the first application, wherein the sequence of keystrokes causes a change to format of data already in the field prior to the receiving of the sequence of keystrokes to input the data, and wherein the expected format for the field is determined from a user interface element of a second application that is open on the computing device; and
        generate an action to prevent loss of sensitive data in response to detection of the instance of suspicious activity.

7. The system of claim 6, wherein to detect the format different than the expected format for the field in the user interface of the first application is by one of natural language processing (NLP) or natural language understanding (NLU).

8. The system of claim 6, wherein to generate the action comprises to disable an operation to copy the data from the first application so as to prevent an unauthorized transfer of sensitive information from the first application.

9. The system of claim 6, wherein to generate the action comprises to generate a notification to one of a user of the first application or an analytics service.

10. A method comprising:
    monitoring, by a computing device, a first application for suspicious activity based on keystrokes to input data to a cell of the first application, wherein the cell is associated with sensitive information;
    detecting, by the computing device, an instance of suspicious activity within the first application based on a sequence of keystrokes, received by the computing device, to input data to the cell of the first application, the sequence of keystrokes to provide characters indicative of sensitive data and in a format different than an expected format for the cell of the first application, wherein the sequence of keystrokes causes a change to format of data already in the cell prior to the receiving of the sequence of keystrokes to input the data, and wherein the expected format for the cell is determined from a user interface element of a second application that is open on the computing device; and generating, by the computing device, an action to prevent loss of sensitive data in response to detection of the instance of suspicious activity.

11. The method of claim 10, wherein detecting the instance of suspicious activity within the first application is by one of natural language processing (NLP) or natural language understanding (NLU).

* * * * *